(12) United States Patent
Nakagawa

(10) Patent No.: US 7,349,417 B2
(45) Date of Patent: Mar. 25, 2008

(54) DEFICIT ROUND-ROBIN SCHEDULING IN A HIGH-SPEED SWITCHING ENVIRONMENT

(75) Inventor: Yukihiro Nakagawa, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 993 days.

(21) Appl. No.: 10/359,838

(22) Filed: Feb. 7, 2003

(65) Prior Publication Data

US 2004/0156376 A1    Aug. 12, 2004

(51) Int. Cl.
*H04L 12/56*    (2006.01)

(52) U.S. Cl. .................... 370/412; 370/229

(58) Field of Classification Search ........... 370/412, 370/355, 229
See application file for complete search history.

(56) References Cited

U.S. PATENT DOCUMENTS 7,020,131 B1 *  3/2006  Yun et al. ............. 370/355
7,042,842 B2 *  5/2006  Paul et al. ............. 370/229
7,079,545 B1 *  7/2006  Yun et al. ............. 370/412

OTHER PUBLICATIONS

Cyriel Minkenberg and Ton Engbersen, "A Combined Input and Output Queued Packet-Switched System Based on PRIZMA Switch-on-a-Chip Technology," IEEE Communications Magazine, pp. 70-77, Dec. 2000.
James P. G. Sterbenz and Joseph D. Touch, "High-Speed Networking," 5 pages, 2001.
Abhijit K. Choudhury and Ellen L. Hahne, "Dynamic Queue Length Thresholds for Shared-Memory Packet Switches," IEEE/ACM Transactions on Networking, , vol. 6, No. 2, pp. 130-140, Apr. 1998.
M. Shreedhar and George Varghese, "Efficient Fair Queuing using Deficit Round Robin," pp. 1-21, Oct. 16, 1995.

* cited by examiner

*Primary Examiner*—Chi Pham
*Assistant Examiner*—Albert T. Chou
(74) *Attorney, Agent, or Firm*—Baker Botts L.L.P.

(57) ABSTRACT

A system for scheduling in a high-speed switching environment includes multiple output queues, multiple counters that each correspond to one of the output queues, and an output port. The output port can read packets from the output queues in a series of rounds. In each of the rounds, the output port can access at least one of the output queues, increment the counter corresponding to the output queue by a first amount, determine whether the counter corresponding to the output queue is at or above a particular level, and, if the counter is at or above the particular level, read one or more packets from the output queue that each have a length and decrement the counter by a second amount corresponding to the one or more lengths of the one or more read packets.

28 Claims, 3 Drawing Sheets

DEFICIT ROUND-ROBIN SCHEDULING IN A HIGH-SPEED SWITCHING ENVIRONMENT

TECHNICAL FIELD OF THE INVENTION

This invention relates generally to communication systems and more particularly to deficit round-robin scheduling in a high-speed switching environment.

BACKGROUND OF THE INVENTION

High-speed serial interconnects have become more common in communications environments, and, as a result, the role that switches play in these environments has become more important. Traditional switches do not provide the scalability and switching speed typically needed to support these interconnects.

SUMMARY OF THE INVENTION

Particular embodiments of the present invention may reduce or eliminate disadvantages and problems traditionally associated with multicasting in a high-speed switching environment.

In one embodiment of the present invention, a system for scheduling in a high-speed switching environment includes multiple output queues, multiple counters that each correspond to one of the output queues, and an output port. The output port can read packets from the output queues in a series of rounds. In each of the rounds, the output port can access at least one of the output queues, increment the counter corresponding to the output queue by a first amount, determine whether the counter corresponding to the output queue is at or above a particular level, and, if the counter is at or above the particular level, read one or more packets from the output queue that each have a length and decrement the counter by a second amount corresponding to the one or more lengths of the one or more read packets.

Particular embodiments of the present invention provide one or more advantages. Particular embodiments reduce memory requirements associated with multicast traffic. In particular embodiments, port modules share memory resources, which tends to eliminate head-of-line blocking, reduce memory requirements, and enable more efficient handling of changes in load conditions at port modules. Particular embodiments provide cut-through forwarding, which provides one or more advantages over store-and-forward techniques. Particular embodiments provide delayed cut-through forwarding, which also provides one or more advantages over store-and-forward techniques. Particular embodiments increase the throughput of a switch core. Particular embodiments increase the speed at which packets are switched by a switch core. Particular embodiments reduce the fall-through latency of a switch core, which is important for cluster applications. Particular embodiments are embodied in a single integrated circuit (IC), or chip. Particular embodiments reduce the power dissipation of a switch core. Particular embodiments can be used in different applications, such as Ethernet switches, INFINIBAND switches, 3GIO switches, HYPERTRANSPORT switches, RAPID IO switches, or proprietary backplane switches. Certain embodiments provide all, some, or none of these technical advantages, and certain embodiments provide one or more other technical advantages readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
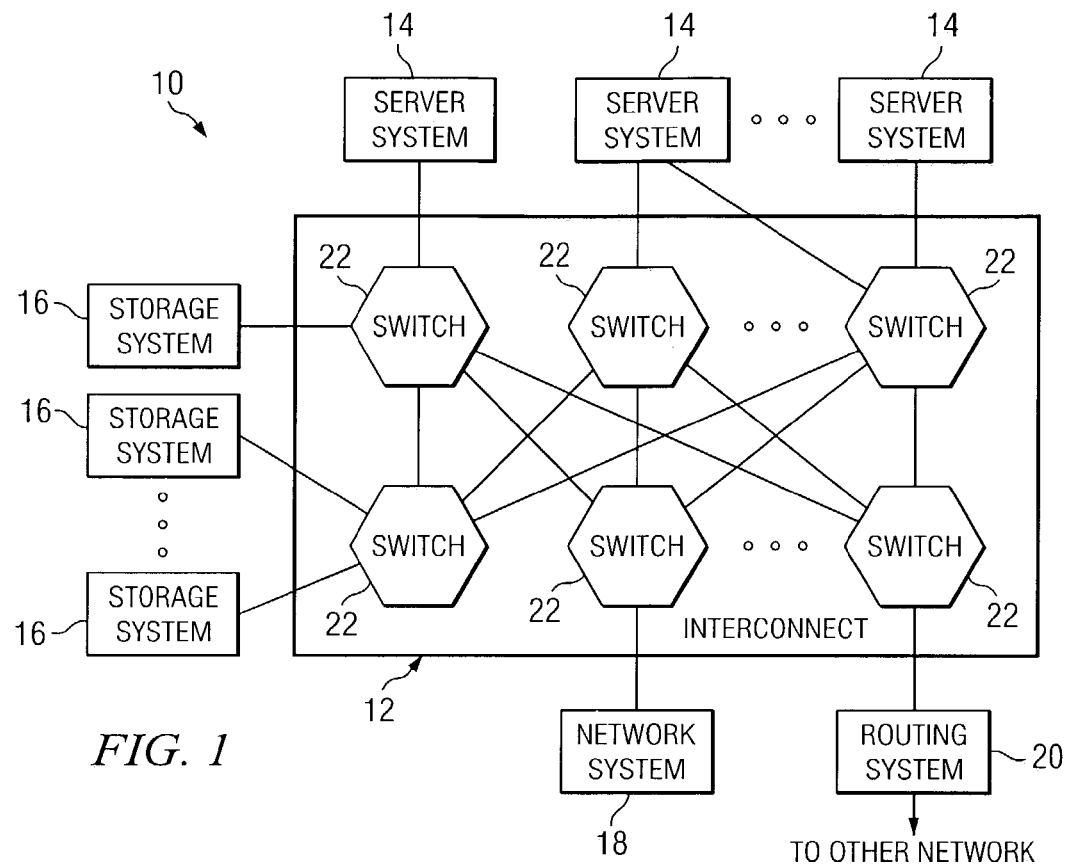
FIG. 1 illustrates an example system area network.

FIG. 1 illustrates an example system area network 10 that includes a serial or other interconnect 12 supporting communication among one or more server systems 14; one or more storage systems 16; one or more network systems 18; and one or more routing systems 20 coupling interconnect 12 to one or more other networks, which include one or more local area networks (LANs), wide area networks (WANs), or other networks. Server systems 14 each include one or more central processing units (CPUs) and one or more memory units. Storage systems 16 each include one or more channel adaptors (CAs), one or more disk adaptors (DAs), and one or more CPU modules (CMs). Interconnect 12 includes one or more switches 22, which, in particular embodiments, include Ethernet switches, as described more fully below. The components of system area network 10 are coupled to each other using one or more links, each of which includes one or more computer buses, local area networks (LANs), metropolitan area networks (MANs), wide area networks (WANs), portions of the Internet, or other wireline, optical, wireless, or other links. Although system area network 10 is described and illustrated as including particular components coupled to each other in a particular configuration, the present invention contemplates any suitable system area network including any suitable components coupled to each other in any suitable configuration.

Figure 2:
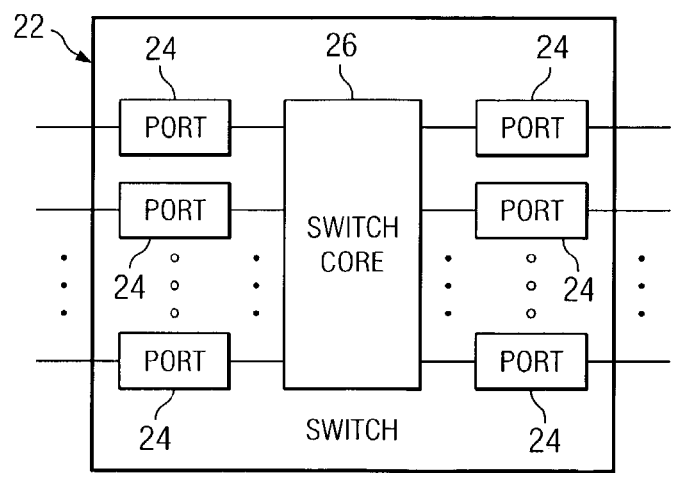
FIG. 2 illustrates an example switch of a system area network.

FIG. 2 illustrates an example switch 22 of system area network 10. Switch 22 includes multiple ports 24 and a switch core 26. Ports 24 are each coupled to switch core 26 and a component of system area network 10 (such as a server system 14, a storage system 16, a network system 18, a routing system 20, or another switch 22). A first port 24 receives a packet from a first component of system area network 10 and communicates the packet to switch core 26 for switching to a second port 24, which communicates the packet to a second component of system area network 10. Reference to a packet can include a packet, datagram, frame, or other unit of data, where appropriate. Switch core 26 receives a packet from a first port 24 and switches the packet to one or more second ports 24, as described more fully below. In particular embodiments, switch 22 includes an Ethernet switch. In particular embodiments, switch 22 can switch packets at or near wire speed.

Figure 3:
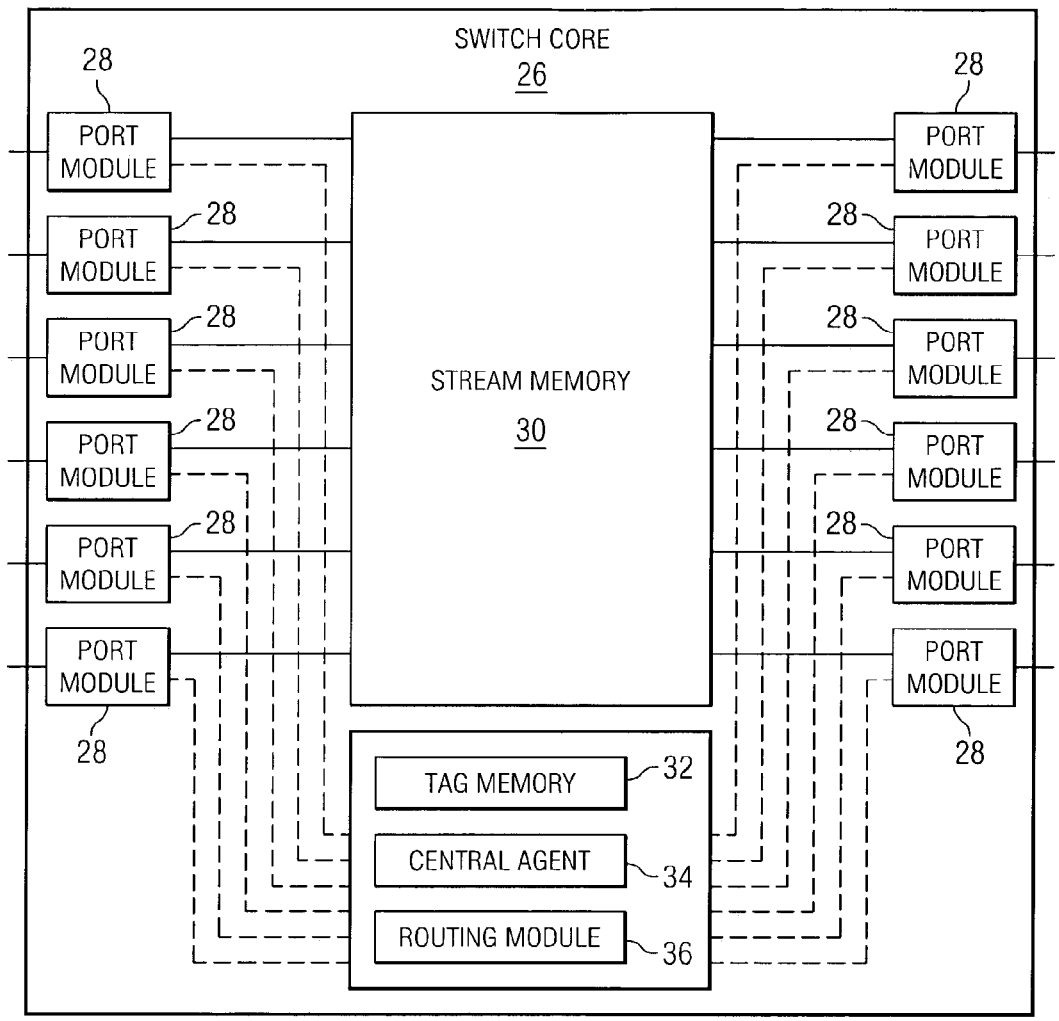
FIG. 3 illustrates an example switch core of a switch.

FIG. 3 illustrates an example switch core 26 of switch 22. Switch core 26 includes twelve port modules 28, stream memory 30, tag memory 32, central agent 34, and routing module 36. The components of switch core 26 are coupled to each other using buses or other links. In particular embodiments, switch core 26 is embodied in a single IC. In a default mode of switch core 26, a packet received by switch core 26 from a first component of system area network 10 can be communicated from switch core 26 to one or more second components of system area network 10 before switch core 26 receives the entire packet. In particular embodiments, cut-through forwarding provides one or more advantages (such as reduced latency, reduced memory requirements, and increased throughput) over store-and-forward techniques. Switch core 26 can be configured for different applications. As an example and not by way of limitation, switch core 26 can be configured for an Ethernet switch 22 (which includes a ten-gigabit Ethernet switch 22 or an Ethernet switch 22 in particular embodiments); an INFINIBAND switch 22; a 3GIO switch 22; a HYPER-TRANSPORT switch 22; a RAPID IO switch 22; a proprietary backplane switch 22 for storage systems 16, network systems 18, or both; or other switch 22.

A port module 28 provides an interface between switch core 26 and a port 24 of switch 22. Port module 28 is coupled to port 24, stream memory 30, tag memory 32, central agent 34, and routing table 36. In particular embodiments, port module 28 includes both input logic (which is used for receiving a packet from a component of system area network 10 and writing the packet to stream memory 30) and output logic (which is used for reading a packet from stream memory 30 and communicating the packet to a component of system area network 10). As an alternative, in particular embodiments, port module 28 includes only input logic or only output logic. Reference to a port module 28 can include a port module 28 that includes input logic, output logic, or both, where appropriate. Port module 28 can also include an input buffer for inbound flow control. In an Ethernet switch 22, a pause function can be used for inbound flow control, which can take time to be effective. The input buffer of port module 28 can be used for temporary storage of a packet that is sent before the pause function stops incoming packets. Because the input buffer would be unnecessary if credits are exported for inbound flow control, as would be the case in an INFINIBAND switch 22, the input buffer is optional. In particular embodiments, the link coupling port module 28 to stream memory 30 includes two links: one for write operations (which include operations of switch core 26 in which data is written from a port module 28 to stream memory 30) and one for read operations (which include operations of switch core 26 in which data is read from stream memory 30 to a port module 28). Each of these links can carry thirty-six bits, making the data path between port module 28 and stream memory 30 thirty-six bits wide in both directions.

A packet received by a first port module 28 from a first component of system area network 10 is written to stream memory 30 from first port module 28 and later read from stream memory 30 to one or more second port modules 28 for communication from second port modules 28 to one or more second components of system area network 10. Reference to a packet being received by or communicated from a port module 28 can include the entire packet being received by or communicated from port module 28 or only a portion of the packet being received by or communicated from port module 28, where appropriate. Similarly, reference to a packet being written to or read from stream memory 30 can include the entire packet being written to or read from stream memory 30 or only a portion of the packet being written to or read from stream memory 30, where appropriate. Any port module 28 that includes input logic can write to stream memory 30, and any port module 28 that includes output logic can read from stream memory 30. In particular embodiments, the sharing of stream memory 30 by port modules 28 eliminates head-of-line blocking (thereby increasing the throughput of switch core 26), reduces memory requirements associated with switch core 26, and enables switch core 26 to more efficiently handle changes in load conditions at port modules 28.

Figure 4:
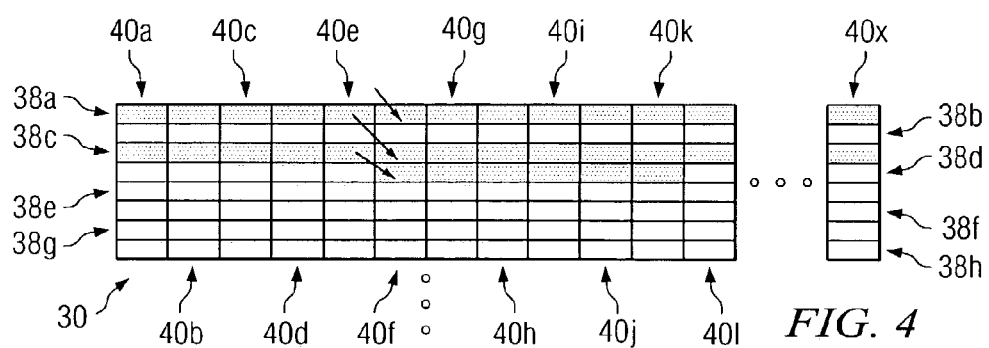
FIG. 4 illustrates an example stream memory of a switch core logically divided into blocks.

Stream memory 30 of switch core 26 is logically divided into blocks 38, which are further divided into words 40, as illustrated in FIG. 4. A row represents a block 38, and the intersection of the row with a column represents a word 40 of block 38. In particular embodiments, stream memory 30 is divided into 1536 blocks 38, each block 38 includes twenty-four words 40, and a word 40 includes seventy-two bits. Although stream memory 30 is described and illustrated as being divided into a particular number of blocks 38 that are divided into a particular number of words 40 including a particular number of bits, the present invention contemplates stream memory 30 being divided into any suitable number of blocks 38 that are divided into any suitable number of words 40 including any suitable number of bits. Packet size can vary from packet to packet. A packet that includes as many bits as or fewer bits than a block 38 can be written to one block 38, and a packet that includes more bits than a block 38 can be written to more than one block 38, which need not be contiguous with each other.

When writing to or reading from a block 38, a port module 28 can start at any word 40 of block 38 and write to or read from words 40 of block 38 sequentially. Port module 28 can also wrap around to a first word 40 of block 38 as it writes to or reads from block 38. A block 38 has an address that can be used to identify block 38 in a write operation or a read operation, and an offset can be used to identify a word 40 of block 38 in a write operation or a read operation. As an example, consider a packet that is 4176 bits long. The packet has been written to fifty-eight words 40, starting at word 40*f* of block 38*a* and continuing to word 40*k* of block 38*d*, excluding block 38*b*. In the write operation, word 40*f* of block 38*a* is identified by a first address and a first offset, word 40*f* of block 38*c* is identified by a second address and a second offset, and word 40*f* of block 38*d* is identified by a third address and a third offset. The packet can also be read from stream memory 30 starting at word 40*f* of block 38*a* and continuing to word 40*k* of block 38*d*, excluding block 38*b*. In the read operation, word 40*f* of block 38*a* can be identified by the first address and the first offset, word 40*f* of block 38*c* can be identified by the second address and the second offset, and word 40*f* of block 38*d* can be identified by the third address and the third offset.

Tag memory 32 includes multiple linked lists that can each be used by a first port module 28 to determine a next block 38 to which to write and by one or more second port modules 28 to determine a next block 38 from which to read. Tag memory 32 also includes a linked list that can be used by central agent 34 to determine a next block 38 that can be made available to a port module 28 for a write operation from port module 28 to stream memory 30, as described more fully below. Tag memory 32 includes multiple entries, at least some of which each correspond to a block 38 of stream memory 30. Each block 38 of stream memory 30 has a corresponding entry in tag memory 32. An entry in tag memory 32 can include a pointer to another entry in tag memory 32, resulting in a linked list.

Entries in tag memory 32 corresponding to blocks 38 that are available to a port module 28 for write operations from port module 28 to stream memory 30 can be linked together such that port module 28 can determine a next block 38 to which to write using the linked entries. As an example, consider four blocks 38 that are available to port module 28 for write operations from port module 28 to stream memory 30. A first entry in tag memory 32 corresponding to a first block 38 includes a pointer to a second block 38, a second entry in tag memory 32 corresponding to second block 38 includes a pointer to a third block 38, and a third entry in tag memory 32 corresponding to third block 38 includes a pointer to a fourth block 38. Port module 28 writes to first block 38 and, while port module 28 is writing to first block 38, uses the pointer in the first entry to determine a next block 38 to which to write. The pointer refers port module 28 to second block 38, and, when port module 28 has finished writing to first block 38, port module 28 writes to second block 38. While port module 28 is writing to second block 38, port module 28 uses the pointer in the second entry to determine a next block 38 to which to write. The pointer refers port module 28 to third block 38, and, when port module 28 has finished writing to second block 38, port module 28 writes to third block 38. While port module 28 is writing to third block 38, port module 28 uses the pointer in the third entry to determine a next block 38 to which to write. The pointer refers port module 28 to fourth block 38, and, when port module 28 has finished writing to third block 38, port module 28 writes to fourth block 38. A linked list in tag memory 32 cannot be used by more than one port module 28 to determine a next block 38 to which to write.

When a block 38 is made available to a port module 28 for write operations from port module 28 to stream memory 30, an entry in tag memory 32 corresponding to block 38 can be added to the linked list that port module 28 is using to determine a next block 38 to which to write. As an example, consider the linked list described above. If the fourth entry is the last element of the linked list, when a fifth block 38 is made available to port module 28, the fourth entry can be modified to include a pointer to fifth block 38.

A linked list in tag memory 32 that a first port module 28 is using to determine a next block 38 to which to write can also be used by one or more second port modules 28 to determine a next block 38 from which to read. As an example, consider the linked list described above. A first portion of a packet has been written from first port module 28 to first block 38, a second portion of the packet has been written from first port module 28 to second block 38, and a third and final portion of the packet has been written from first port module 28 to third block 38. An end mark has also been written to third block 38 to indicate that a final portion of the packet has been written to third block 38. A second port module 28 reads from first block 38 and, while second port module 28 is reading from first block 38, uses the pointer in the first entry to determine a next block 38 from which to read. The pointer refers second port module 28 to second block 38, and, when second port module 28 has finished reading from first block 38, second port module 28 reads from second block 38. While second port module 28 is reading from second block 38, second port module 28 uses the pointer in the second entry to determine a next block 38 from which to read. The pointer refers second port module 28 to third block 38, and, when second port module 28 has finished reading from second block 38, second port module 28 reads from third block 38. Second port module 28 reads from third block 38 and, using the end mark in third block 38, determines that a final portion of the packet has been written to third block 38. While a linked list in tag memory 32 cannot be used by more than one first port module 28 to determine a next block 38 to which to write, the linked list can be used by one or more second port modules 28 to determine a next block 38 from which to read.

Different packets can have different destinations, and the order in which packets make their way through stream memory 30 need not be first in, first out (FIFO). As an example, consider a first packet received and written to one or more first blocks 38 before a second packet is received and written to one or more second blocks 38. The second packet could be read from stream memory 30 before the first packet, and second blocks 38 could become available for other write operations before first blocks 38. In particular embodiments, a block 38 of stream memory 30 to which a packet has been written can be made available to a port module 28 for a write operation from port module 28 to block 38 immediately after the packet has been read from block 38 by all port modules 28 that are designated port modules 28 of the packet. A designated port module 28 of a packet includes a port module 28 coupled to a component of system area network 10, downstream from switch core 26, that is a final or intermediate destination of the packet.

In particular embodiments, credits are allocated to input logic of port modules 28 and are used to manage write operations. Using credits to manage write operations can facilitate cut-through forwarding by switch core 26, which reduces latency, increases throughput, and reduces memory requirements associated with switch core 26. Also, if credits are used to manage write operations, determinations regarding which port module 28 can write to which block 38 at which time can be made locally at port modules 28, which increases the throughput and switching speed of switch core 26. Using credits to manage write operations can also eliminate head-of-line blocking and provide greater flexibility in the distribution of memory resources among port modules 28 in response to changing load conditions at port modules 28. A credit corresponds to a block 38 of stream memory 30 and can be used by a port module 28 to write to block 38. A credit can be allocated to a port module 28 from a pool of credits, which is managed by central agent 34. Reference to a credit being allocated to a port module 28 includes a block 38 corresponding to the credit being made available to port module 28 for a write operation from port module 28 to block 38, and vice versa.

A credit in the pool of credits can be allocated to any port module 28 and need not be allocated to any particular port module 28. A port module 28 can use only a credit that is available to port module 28 and cannot use a credit that is available to another port module 28 or that is in the pool of credits. A credit is available to port module 28 if the credit has been allocated to port module 28 and port module 28 has not yet used the credit. A credit that has been allocated to port module 28 is available to port module 28 until port module 28 uses the credit. A credit cannot be allocated to more than one port module 28 at a time, and a credit cannot be available to more than one port module 28 at the same time. In particular embodiments, when a first port module 28 uses a credit to write a packet to a block 38 corresponding to the credit, the credit is returned to the pool of credits immediately after all designated port modules 28 of the packet have read the packet from block 38.

Central agent 34 can allocate credits to port modules 28 from the pool of credits. As an example, central agent 34 can make an initial allocation of a predetermined number of credits to a port module 28. In particular embodiments, central agent 34 can make an initial allocation of credits to port module 28 at the startup of switch core 26 or in response to switch core 26 being reset. As another example, central agent 34 can allocate a credit to a port module 28 to replace another credit that port module 28 has used. In particular embodiments, when port module 28 uses a first credit, port module 28 notifies central agent 34 that port module 28 has used the first credit, and, in response to port module 28 notifying central agent 34 that port module 28 has used the first credit, central agent 34 allocates a second credit to port module 28 to replace the first credit, but only if the number of blocks 38 that are being used by port module 28 does not meet or exceed an applicable limit. Reference to a block 38 that is being used by a port module 28 includes a block 38 to which a packet has been written from port module 28 and from which all designated port modules 28 of the packet have not read the packet. By replacing, up to an applicable limit, credits used by port module 28, the number of credits available to port module 28 can be kept relatively constant and, if the load conditions at port module 28 increase, more blocks 38 can be supplied to port module 28 in response to the increase in load conditions at port module 28. A limit can be applied to the number of blocks used by port module 28, which can prevent port module 28 from using too many blocks 38 and thereby use up too many shared memory resources. The limit can be controlled dynamically based on the number of credits in the pool of credits. If the number of credits in the pool of credits decreases, the limit can also decrease. The calculation of the limit and the process according to which credits are allocated to port module 28 can take place out of the critical path of packets through switch core 26, which increases the switching speed of switch core 26.

A linked list in tag memory 32 can be used by central agent 34 to determine a next credit that can be allocated to a port module 28. The elements of the linked list can include entries in tag memory 32 corresponding to blocks 38 that in turn correspond to credits in the pool of credits. As an example, consider four credits in the pool of credits. A first credit corresponds to a first block 38, a second credit corresponds to a second block 38, a third credit corresponds to a third block 38, and a fourth credit corresponds to a fourth block 38. A first entry in tag memory 32 corresponding to first block 38 includes a pointer to second block 38, a second entry in tag memory 32 corresponding to second block 38 includes a pointer to third block 38, and a third entry in tag memory 32 corresponding to third block 38 includes a pointer to fourth block 38. Central agent 34 allocates the first credit to a port module 28 and, while central agent 34 is allocating the first credit to a port module 28, uses the pointer in the first entry to determine a next credit to allocate to a port module 28. The pointer refers central agent 34 to second block 38, and, when central agent 34 has finished allocating the first credit to a port module 28, central agent 34 allocates the second credit to a port module 28. While central agent 34 is allocating the second credit to a port module 28, central agent 34 uses the pointer in the second entry to determine a next credit to allocate to a port module 28. The pointer refers central agent 34 to third block 38, and, when central agent 34 has finished allocating the second credit to a port module 28, central agent allocates the third credit to a port module 28. While central agent 34 is allocating the third credit to a port module 28, central agent 34 uses the pointer in the third entry to determine a next credit to allocate to a port module 28. The pointer refers central agent 34 to fourth block 38, and, when central agent 34 has finished allocating the third credit to a port module 28, central agent allocates the fourth credit to a port module 28.

When a credit corresponding to a block 38 is returned to the pool of credits, an entry in tag memory 32 corresponding to block 38 can be added to the end of the linked list that central agent 34 is using to determine a next credit to allocate to a port module 28. As an example, consider the linked list described above. If the fourth entry is the last element of the linked list, when a fifth credit corresponding to a fifth block 38 is added to the pool of credits, the fourth entry can be modified to include a pointer to a fifth entry in tag memory 32 corresponding to fifth block 38. Because entries in tag memory 32 each correspond to a block 38 of stream memory 30, a pointer that points to a block 38 also points to an entry in tag memory 32.

When a port module 28 receives an incoming packet, port module 28 determines whether enough credits are available to port module 28 to write the packet to stream memory 30. In particular embodiments, if enough credits are available to port module 28 to write the packet to stream memory 30, port module 28 can write the packet to stream memory 30 using one or more credits. In particular embodiments, if enough credits are not available to port module 28 to write the packet to stream memory 30, port module 28 can write the packet to an input buffer and later, when enough credits are available to port module 28 to write the packet to stream memory 30, write the packet to stream memory 30 using one or more credits. As an alternative to port module 28 writing the packet to an input buffer, port module 28 can drop the packet. In particular embodiments, if enough credits are available to port module 28 to write only a portion of the packet to stream memory 30, port module 28 can write to stream memory 30 the portion of the packet that can be written to stream memory 30 using one or more credits and write one or more other portions of the packet to an input buffer. Later, when enough credits are available to port module 28 to write one or more of the other portions of the packet to stream memory 30, port module 28 can write one or more of the other portions of the packet to stream memory 30 using one or more credits. In particular embodiments, delayed cut-through forwarding, like cut-through forwarding, provides one or more advantages (such as reduced latency, reduced memory requirements, and increased throughput) over store-and-forward techniques. Reference to a port module 28 determining whether enough credits are available to port module 28 to write a packet to stream memory 30 includes port module 28 determining whether enough credits are available to port module 28 to write the entire packet to stream memory 30, write only a received portion of the packet to stream memory 30, or write at least one portion of the packet to stream memory 30, where appropriate.

In particular embodiments, the length of an incoming packet cannot be known until the entire packet has been received. In these embodiments, a maximum packet size (according to an applicable set of standards) can be used to determine whether enough credits are available to a port module 28 to write an incoming packet that has been received by port module 28 to stream memory 30. According to a set of standards published by the Institute of Electrical and Electronics Engineers (IEEE), the maximum size of an Ethernet frame is 1500 bytes. According to a de facto set of standards, the maximum size of an Ethernet frame is nine thousand bytes. As an example and not by way of limitation, consider a port module 28 that has received only a portion of an incoming packet. Port module 28 uses a maximum packet size (according to an applicable set of standards) to determine whether enough credits are available to port module 28 to write the entire packet to stream memory 30. Port module 28 can make this determination by comparing the maximum packet size with the number of credits available to port module 28. If enough credits are available to port module 28 to write the entire packet to stream memory 30, port module 28 can write the received portion of the packet to stream memory 30 using one or more credits and write one or more other portions of the packet to stream memory 30 using one or more credits when port module 28 receives the one or more other portions of the packet.

A port module 28 can monitor the number of credits available to port module 28 using a counter. When central agent 34 allocates a credit to port module 28, port module 28 increments the counter by an amount, and, when port module 28 uses a credit, port module 28 decrements the counter by an amount. The current value of the counter reflects the current number of credits available to port module 28, and port module 28 can use the counter to determine whether enough credits are available to port module 28 to write a packet from port module 28 to stream memory 30. Central agent 34 can also monitor the number of credits available to port module 28 using a counter. When central agent 34 allocates a credit to port module 28, central agent 34 increments the counter by an amount, and, when port module 28 notifies central agent 34 that port module 28 has used a credit, central agent 34 decrements the counter by an amount. The current value of the counter reflects the current number of credits available to port module 28, and central agent 34 can use the counter to determine whether to allocate one or more credits to port module 28. Central agent 34 can also monitor the number of blocks 38 that are being used by port module 28 using a counter. When port module 28 notifies central agent 34 that port module 28 has written to a block 38, central agent increments the counter by an amount and, when a block 38 to which port module 28 has written is released and a credit corresponding to block 38 is returned to the pool of credits, central agent decrements the counter by an amount.

The number of credits that are available to a port module 28 can be kept constant, and the number of blocks 38 that are being used by port module 28 can be limited. The limit can be changed in response to changes in load conditions at port module 28, one or more other port module 28, or both. In particular embodiments, the number of blocks 38 that are being used by a port module 28 is limited according to a dynamic threshold that is a function of the number of credits in the pool of credits. An active port module 28, in particular embodiments, includes a port module 28 that is using one or more blocks 38. Reference to a port module 28 that is using a block 38 includes a port module 28 that has written at least one packet to stream memory 30 that has not been read from stream memory 30 to all designated port modules 28 of the packet. A dynamic threshold can include a fraction of the number of credits in the pool of credits calculated using the following formula, in which $\alpha$ equals the number of port modules 28 that are active and $\rho$ is a parameter:

$$\frac{\rho}{1+(\rho \times \alpha)}$$

A number of credits in the pool of credits can be reserved to prevent central agent 34 from allocating a credit to a port module 28 if the number of blocks 38 that are each being used by a port module 28 exceeds an applicable limit, which can include the dynamic threshold described above. Reserving one or more credits in the pool of credits can provide a cushion during a transient period associated with a change in the number of port modules 28 that are active. The fraction of credits that are reserved is calculated using the following formula, in which $\alpha$ equals the number of active port modules 28 and $\rho$ is a parameter:

$$\frac{1}{1+(\rho \times \alpha)}$$

According to the above formulas, if one port module 28 is active and $\rho$ is two, central agent 34 reserves one third of the credits and may allocate up to two thirds of the credits to port module 28; if two port modules 28 are active and $\rho$ is one, central agent 34 reserves one third of the credits and may allocate up to one third of the credits to each port module 28 that is active; and if twelve port modules 28 are active and $\rho$ is 0.5, central agent 34 reserves two fourteenths of the credits and may allocate up to one fourteenth of the credits to each port module 28 that is active. Although a particular limit is described as being applied to the number of blocks 38 that are being used by a port module 28, the present invention contemplates any suitable limit being applied to the number of blocks 38 that are being used by a port module 28.

When a first port module 28 writes a packet to stream memory 30, first port module 28 can communicate to routing module 36 information from the header of the packet (such as one or more destination addresses) that routing module 36 can use to identify one or more second port modules 28 that are designated port modules 28 of the packet. First port module 28 can also communicate to routing module 36 an address of a first block 38 to which the packet has been written and an offset that together can be used by second port modules 28 to read the packet from stream memory 30. Routing module 36 can identify second port modules 28 using one or more routing tables and the information from the header of the packet and, after identifying second port modules 28, communicate the address of first block 38 and the offset to each second port module 28, which second port module 28 can add to an output queue, as described more fully below.

Central agent 34 returns a credit to the pool of credits only if all designated port modules 28 of a packet that has been written to a block 38 corresponding to the credit have read from block 38. As an example, consider a packet that has been written to a block 38 and that has two designated port modules 28. First designated port module 28 reads from block 38 and notifies central agent 34 that first designated port module 28 has read from block 38. Because second port module 28 has not yet read from block 38 and notified central agent 34 that second designated port module 28 has read from block 38, central agent 34 does not return a credit corresponding to block 38 to the pool of credits in response to the notification from first port module 28. Later, second designated port module 28 reads from block 38 and notifies central agent 34 that second designated port module 28 has read from block 38. Because first port module 28 has already read from block 38 and notified central agent 34 that first designated port module 28 has read from block 38, central agent 34 returns the credit corresponding to block 38 to the pool of credits in response to the notification from second port module 28.

To determine whether all designated port modules 28 of a packet have read from a block 38 to which the packet has been written, central agent 34 can use a bit vector. A bit vector can include two or more elements that each correspond to a port module 28 and indicate whether port module 28 has read from a block 38. When a packet is written to stream memory 30, central agent 34 can set the elements of a bit vector to indicate which port modules 28 of switch core 26 are designated port modules 28 of the packet, and, as designated port modules 28 read the packet from stream memory 30, central agent 34 can clear the elements of the bit vector.

As an example, consider a bit vector that includes six elements. A first element corresponds to a first port module 28, a second element corresponds to a second port module 28, a third element corresponds to a third port module 28, a fourth element corresponds to a fourth port module 28, a fifth element corresponds to a fifth port module 28, and a sixth element corresponds to a sixth port module 28. A packet is written to a block 38 of stream memory 30, and third port module 28, fourth port module 28, and sixth port module 28 are all designated port modules 28 of the packet. A third element of the bit vector corresponding to third port module 28 is set to indicate that third port module 28 is a designated port module 28 of the packet, a fourth element of the bit vector corresponding to fourth port module 28 is set to indicate that fourth port module 28 is a designated port module 28 of the packet, and a sixth element of the bit vector corresponding to sixth port module 28 is set to indicate that sixth port module 28 is a designated port module 28 of the packet. A first element of the bit vector, a second element of the bit vector, and a fifth element of the bit vector are all left clear, indicating that a first port module, a second port module 28, and a fifth port module 28, respectively, are not designated port modules 28.

Third port module 28 reads from block 38 first, and, when third port module 28 reads from block 38, the third element of the bit vector is cleared. The bit vector indicates that fourth port module 28 and sixth port module 28 have not yet read packet from block 38. Sixth port module 28 reads from block 38 next, and, when sixth port module 28 reads from block 38, the sixth element of the bit vector is cleared. The bit vector indicates that fourth port module 28 has not yet read from block 38. Fourth port module 28 reads from block 38 last, and, when fourth port module 28 reads from block 38, because fourth port module 28 is a last designated port module 28 to read from block 38, a credit corresponding to block 38 is returned to the pool of credits.

A bit vector can be stored in an entry of a multicast state table. The multicast state table can include multiple entries, at least some of which each correspond to a block 38 of stream memory 30. Each block 38 of stream memory 30 has a corresponding entry in tag memory 32. An error detection code (EDC) for detecting single- and multiple-bit errors can also be stored along with a bit vector in an entry in the multicast state table. When a packet has been written to stream memory 30, elements of a bit vector in an entry in the multicast state table corresponding to a first block 38 to which the packet has been written are set to indicate which port modules 28 are designated port modules 28 of the packet, as described above. Only the elements of the bit vector in the entry corresponding to first block 38 to which the packet has been written are set. When a designated port module 28 reads from first block 38, an element corresponding to designated port module 28 is cleared to indicate that designated port module 28 has started reading the packet from stream memory 30. When a last designated port module 28 reads from first block 38, central agent 34 returns a credit corresponding to first block 38 to the pool of credits. Central agent 34 returns credits corresponding to subsequent blocks 38 to which the packet has been written to the pool of credits as last designated port module 28 reads from subsequent blocks 38.

As an example, consider a packet that has been written to stream memory 30. A first portion of the packet has been written to a first block 38, and a second and final portion of the packet has been written to a second block 38. A first credit corresponds to first block 38, and a second credit corresponds to second block 38. A fifth port module 28 and a seventh port module 28 of switch core 26 are designated port modules 28 of the packet. A first entry in a multicast state table corresponds to first block 38, and second entry in the multicast state table corresponds to second block 38. Central agent 34 sets a fifth element and a seventh element of a bit vector in the first entry to indicate that fifth port module 28 and seventh port module 28, respectively, are designated port modules 28 of the packet. Central agent 34 need not set any elements of a bit vector in the second entry. Seventh port module 28 reads from first block 38 and notifies central agent 34 that seventh port module 28 has read from first block 38. Central agent 34 determines, from the bit vector in the first entry, that seventh port module 28 is not a last designated port module 28 to start reading the packet from stream memory 30 and clears the seventh element of the bit vector in the first entry, indicating that seventh port module 28 has started reading the packet from stream memory 30. Because seventh port module 28 is not a last designated port module 28 to start reading the packet from stream memory 30, central agent does not yet return the first credit to the pool of credits.

Fifth port module 28 reads from first port module 28 next and notifies central agent 34 that fifth port module 28 has read from first block 38. Central agent 34 determines, from the bit vector in the first entry, that fifth port module 28 is a last designated port module 28 to start reading the packet from stream memory 30 and, because fifth port module 28 is a last designated port module 28 to start reading the packet from stream memory 30, returns the first credit to the pool of credits. Seventh port module 28 then reads from second port module 28 and notifies central agent 34 that seventh port module 28 has read from second port module 28. Central agent determines, from the bit vector in the first entry, that seventh port module 28 is not a last designated port module 28 to start reading the packet from stream memory 30 and, because seventh port module 28 is not a last designated port module 28 to start reading the packet from stream memory 30, does not yet return second credit to the pool of credits. Fifth port module 28 reads from second port module 28 next and notifies central agent 34 that fifth port module 28 has read from second block 38. Central agent 34 determines, from the bit vector in the first entry, that fifth port module 28 is a last designated port module 28 to start reading the packet from stream memory 30 and, because fifth port module 28 is a last designated port module 28 to start reading the packet from stream memory 30, returns the second credit to the pool of credits.

In the above example, if fifth port module 28 overtook seventh port module 28 and read from second block 38 before seventh port module 28 read from second block 38, the second credit would be returned to the pool of credits before seventh port module 28 read from second block 38. To reduce the likelihood that fifth port module 28 will overtake seventh port module 28, fifth port module 28 and seventh port module 28 can both read from first block 38 and second block 38 at approximately the same speed.

Also, in the above example, if the first credit, after being returned to the pool of credits, were allocated to a port module 28 and used to write to first block 38 before second port module 28 had read from second block 38, the bit vector in the first entry would be overwritten such that central agent 34 would be unable to determine whether fifth port module 28 or seventh port module 28 were a last port module 28 to start reading the packet from stream memory 30. To reduce the likelihood that the bit vector in the first entry will be overwritten, a dynamic threshold can be applied to the number of credits that are available to a port module 28, as described above. The dynamic threshold can prevent the number of credits in the pool of credits from becoming so small that all designated port modules 28 of a packet do not have enough time to read the packet from stream memory 30 before a bit vector is overwritten in an entry in the multicast state table corresponding to a first block 38 to which the packet has been written.

Switch 22 can be coupled to a component of system area network 10 using more than one link, and more than one port module 28 of switch core 26 can be coupled to the same component of system area network 10. If switch 22 is coupled to a component of system area network 10 using more than one link and more than one port module 28 of switch core 26 is coupled to the same component of system area network 10, there are multiple active paths between end nodes, and more than one instance of a multicast packet might be communicated from switch 22 to the same component of system area network 10 from switch 22. To prevent more than one port module 28 from communicating an instance of a multicast packet to the same component of system area network 10, multicast filter bit vectors can be used. A multicast packet can have more than one designated port module 28. In particular embodiments, one or more bits in a packet (such as a most significant bit) indicate whether the packet is a multicast packet. A multicast filter bit vector corresponds to a port module 28, and a multicast filter bit vector corresponding to a first port module 28 identifies one or more second port modules 28 from which first port module 28 may forward multicast packets. A multicast filter bit vector includes two or more elements that each correspond to a port module 28 and indicate whether multicast packets received by port module 28 may be forwarded. As an example and not by way of limitation, consider a first multicast filter bit vector and a second multicast filter bit vector that each include four elements. A first element of each bit vector corresponds to a first port module 28, a second element of each bit vector corresponds to a second port module 28, a third element of each bit vector corresponds to a third port module 28, and a fourth element of each bit vector corresponds to a fourth port module 28. The first multicast bit vector corresponds to second port module 28, and the second multicast bit vector corresponds to third port module 28. Second port module 28 and third port module 28 are coupled to the same component of system area network 10.

Second port module 28 may forward multicast packets received and written to stream memory 30 by fourth port module 28 and may not forward multicast packets received and written to stream memory 30 by first port module 28, second port module 28, or third port module 28. The first element of the first bit vector is set to indicate that second port module 28 may not forward a multicast packet received and written to stream memory 30 by first port module 28; the second element of the first bit vector is set to indicate that second port module 28 may not forward a multicast packet received and written to stream memory 30 by second port module 28; the third element of the first bit vector is set to indicate that second port module 28 may not forward a multicast packet received and written to stream memory 30 by third port module 28; and the fourth element of the first bit vector is cleared to indicate that second port module 28 may forward a multicast packet received and written to stream memory 30 by fourth port module 28.

Third port module 28 may forward multicast packets received and written to stream memory 30 by first port module 28 and may not forward multicast packets received and written to stream memory 30 by second port module 28, third port module 28, or fourth port module 28. The first element of the second bit vector is cleared to indicate that third port module 28 may forward multicast packets received and written to stream memory 30 by first port module 28; the second element of the second bit vector is set to indicate that third port module 28 may not forward multicast packets received and written to stream memory 30 by second port module 28; the third element of the second bit vector is set to indicate that third port module 28 may not forward multicast packets received and written to stream memory 30 by third port module 28; and the fourth element of the second bit vector is set to indicate that third port module 28 may not forward multicast packets received and written to stream memory 30 by fourth port module 28.

When a multicast packet is received and written to stream memory 30 by first port module 28 and, according to information in the header or other portion of the multicast packet, second port module 28 and third port module 28 are both designated port modules 28 of the multicast packet, first port module 28 and second port module 28 are each notified that the multicast packet has been written to stream memory 30. The notification includes information indicating that the packed has been received and written to stream memory 30 by first port module 28. Using the information, second port module 28 determines that, according to the first bit vector, second port module 28 may not forward the multicast packet and may, therefore, drop the multicast packet. Using the information, third port module 28 determines that, according to the second bit vector, third port module 28 may forward the multicast packet and may, therefore, add the multicast packet to an output queue of third port module 28, as described more fully below.

When a multicast packet is received and written to stream memory 30 by fourth port module 28 and, according to information in the header or other portion of the multicast packet, second port module 28 and third port module 28 are both designated port modules 28 of the multicast packet, first port module 28 and second port module 28 are each notified that the multicast packet has been written to stream memory 30. The notification includes information indicating that the packed has been received and written to stream memory 30 by fourth port module 28. Using the information, second port module 28 determines that, according to the first bit vector, second port module 28 may forward the multicast packet and may, therefore, add the multicast packet to an output queue of third port module 28, as described more fully below. Using the information, third port module 28 determines that, according to the second bit vector, third port module 28 may not forward the multicast packet and may, therefore, drop the multicast packet. Although a particular multicast filter bit vector including a particular number of elements is described, the present invention contemplates any suitable multicast filter bit vector.

In particular embodiments, a multicast filter bit vector is applied only to multicast packets. In particular embodiments, as an alternative, a multicast filter bit vector can be applied to unicast packets that have been flooded because the destination addresses of the packets are unknown. To prevent a packet that is not a multicast packet from being filtered according to a multicast filter bit vector, when a port module 28 is notified that a packet has been written to stream memory 30, the notification can include information that indicates whether the packet is a multicast packet. If the packet is a multicast packet, port module 28 applies a multicast filter bit vector to the packet to determine whether port module 28 may forward the packet. If, on the other hand, the packet is not a multicast packet, port module 28 does not apply a multicast filter bit vector, and the packet may be forwarded by port module 28 regardless of which port module 28 received the packet and wrote the packet to stream memory 30. In particular embodiments, the use of multicast filter bit vectors by port modules 28 can be disabled, according to particular needs. In particular embodiments, elements of a multicast filter bit vector can be set and cleared manually. In particular embodiments, elements of a multicast filter bit vector can be automatically set and cleared according to a topology of system area network 10 that has been automatically discovered by a process.

A port module 28 can include one or more output queues that are used to queue packets that have been written to stream memory 30 for communication out of switch core 26 through port module 28. When a packet is written to stream memory 30, the packet is added to an output queue of each designated port module 28 of the packet. An output queue of a designated port module 28 can correspond to a combination of a level of quality of service (QoS) and a source port module 28. As an example, consider a switch core 26 that provides three levels of QoS and includes four port modules 28 including both input logic and output logic. A first port module 28 includes nine output queues: a first output queue corresponding to the first level of QoS and a second port module 28; a second output queue corresponding to the first level of QoS and a third port module 28; a third output queue corresponding to the first level of QoS and a fourth port module 28; a fourth output queue corresponding to the second level of QoS and second port module 28; a fifth output queue corresponding to the second level of QoS and third port module 28; a sixth output queue corresponding to the second level of QoS and fourth port module 28; a seventh output queue corresponding to the third level of QoS and second port module 28; an eighth output queue corresponding to the third level of QoS and third port module 28; and a ninth output queue corresponding to the third level of QoS and fourth port module 28. A packet that has been written to stream memory 30 is added to the first output queue of first port module 28 if (1) the packet has been written to stream memory 30 from second port module 28, (2) first port module 28 is a designated port module 28 of the packet, and (3) the level of QoS of the packet is the first level of QoS. A packet that has been written to stream memory 30 is added to the fifth output queue of first port module 28 if (1) the packet has been written to stream memory 30 from third port module 28, (2) first port module 28 is a designated port module 28 of the packet, and (3) the level of QoS of the packet is the second level of QoS. A packet that has been written to stream memory 30 is added to the ninth output queue of first port module 28 if (1) the packet has been written to stream memory 30 from fourth port module 28, (2) first port module 28 is a designated port module 28 of the packet, and (3) the level of QoS of the packet is the third level of QoS.

Second port module 28 also includes nine output queues: a first output queue corresponding to the first level of QoS and a first port module 28; a second output queue corresponding to the first level of QoS and a third port module 28; a third output queue corresponding to the first level of QoS and a fourth port module 28; a fourth output queue corresponding to the second level of QoS and first port module 28; a fifth output queue corresponding to the second level of QoS and third port module 28; a sixth output queue corresponding to the second level of QoS and fourth port module 28; a seventh output queue corresponding to the third level of QoS and first port module 28; an eighth output queue corresponding to the third level of QoS and third port module 28; and a ninth output queue corresponding to the third level of QoS and fourth port module 28. A packet that has been written to stream memory 30 is added to the first output queue of second port module 28 if (1) the packet has been written to stream memory 30 from first port module 28, (2) second port module 28 is a designated port module 28 of the packet, and (3) the level of QoS of the packet is the first level of QoS. A packet that has been written to stream memory 30 is added to the fifth output queue of second port module 28 if (1) the packet has been written to stream memory 30 from third port module 28, (2) second port module 28 is a designated port module 28 of the packet, and (3) the level of QoS of the packet is the second level of QoS. A packet that has been written to stream memory 30 is added to the ninth output queue of second port module 28 if (1) the packet has been written to stream memory 30 from fourth port module 28, (2) second port module 28 is a designated port module 28 of the packet, and (3) the level of QoS of the packet is the third level of QoS.

Third port module 28 and fourth port module 28 each include output queues similar to the output queues of first port module 28 and the output queues of second port module 28 described above. QoS can encompass rate of transmission, rate of error, or other aspect of the communication of packets through switch core 26, and reference to QoS can include class of service (CoS), where appropriate. Although an output queue of a first port module 28 is described as corresponding to a second port module 28 and a level of QoS, an output queue of a first port module 28 need not necessarily correspond to a second port module 28 and a level of QoS. As an example, in particular embodiments, an output queue of a first port module 28 can correspond to a second port module 28 and not a level of QoS.

An output queue of a port module 28 includes a register of port module 28 and, if there is more than one packet in the output queue, one or more entries in a memory structure of port module 28, as described below. A port module 28 includes a memory structure that can include one or more linked lists that port module 28 can use, along with one or more registers, to determine a next packet to read from stream memory 30. The memory structure includes multiple entries, at least some of which each correspond to a block 38 of stream memory 30. Each block 38 of stream memory 30 has a corresponding entry in the memory structure. An entry in the memory structure can include a pointer to another entry in the memory structure, resulting in a linked list. A port module 28 also includes one or more registers that port module 28 can also use to determine a next packet to read from stream memory 30. A register includes a write pointer, an offset, and a read pointer. The write pointer can point to a first block 38 to which a first packet has been written, the offset can indicate a first word 40 to which the first packet has been written, and the read pointer can point to a first block 38 to which a second packet (which could be the same packet as or a packet other than the first packet) has been written. Because entries in the memory structure each correspond to a block 38 of stream memory 30, a pointer that points to a block 38 also points to an entry in the memory structure.

Port module 28 can use the write pointer to determine a next entry in the memory structure to which to write an offset. Port module 28 can use the offset to determine a word 40 of a block 38 at which to start reading from block 38. Port module 28 can use the read pointer to determine a next packet to read from stream memory 30. Port module 28 can also use the write pointer and the read pointer to determine whether more than one packet is in the output queue. If output queue is not empty and the write pointer and the read pointer both point to the same block 38, there is only one packet in the output queue. If there is only one packet in the output queue, port module 28 can determine a next packet to read from stream memory 30 and read the next packet from stream memory 30 without accessing the memory structure.

If a first packet is added to the output queue when there are no packets in the output queue, (1) the write pointer in the register is modified to point to a first block 38 to which the first packet has been written, (2) the offset is modified to indicate a first word 40 to which the first packet has been written, and (3) the read pointer is also modified to point to first block 38 to which the first packet has been written. If a second packet is added to the output queue before port module 28 reads the first packet from stream memory 30, (1) the write pointer is modified to point to a first block 38 to which the second packet has been written, (2) the offset is written to a first entry in the memory structure corresponding to first block 38 to which the first packet has been written and then modified to indicate a first word 40 to which the second packet has been written, and (3) a pointer in the first entry is modified to point to first block 38 to which the second packet has been written. The read pointer is left unchanged such that, after the second packet is added to the output queue, the read pointer still points to first block 38 to which the first packet has been written. As described more fully below, the read pointer is changed when port module 28 reads a packet in the output queue from stream memory 30. If a third packet is added to the output queue before port module 28 reads the first packet and the second packet from stream memory 30, (1) the write pointer is modified to point to a first block 38 to which the third packet has been written, (2) the offset is written to a second entry in the memory structure corresponding to first block 38 to which the second packet has been written and modified to indicate a first word 40 to which the third packet has been written, and (3) a pointer in the second entry is modified to point to first block 38 to which the third packet has been written. The read pointer is again left unchanged such that, after the third packet is added to the output queue, the read pointer still points to first block 38 to which the first packet has been written.

Port module 28 can use the output queue to determine a next packet to read from stream memory 30. As an example, consider the output queue described above in which there are three packets. In the register, (1) the write pointer points to first block 38 to which the third packet has been written, (2) the offset indicates first word 40 to which the third packet has been written, and (3) the read pointer points to first block 38 to which the first packet has been written. The first entry in the memory structure includes (1) an offset that indicates first word 40 to which the first packet has been written and (2) a pointer that points to first block 38 to which the second packet has been written. The second entry in the memory structure includes (1) an offset that indicates first word 40 to which the second packet has been written and (2) a pointer that points to first block 38 to which the third packet has been written.

Port module 28 compares the read pointer with the write pointer and determines, from the comparison, that there is more than one packet in the output queue. Port module 28 then uses the read pointer to determine a next packet to read from stream memory 30. The read pointer refers port module 28 to first block 38 of the first packet, and, since there is more than one packet in the output queue, port module 28 accesses the offset in the first entry indicating first word 40 to which the first packet has been written. Port module 28 then reads the first packet from stream memory 30, using the offset in the first entry, starting at first block 38 to which the first packet has been written. If the first packet has been written to more than one block 38, port module 28 can use a linked list in tag memory 32 to read the first packet from memory, as described above.

While port module 28 is reading the first packet from stream memory 30, port module 28 copies the pointer in the first entry to the read pointer, compares the read pointer with the write pointer, and determines, from the comparison, that there is more than one packet in the output queue. Port module 28 then uses the read pointer to determine a next packet to read from stream memory 30. The read pointer refers port module 28 to first block 38 of the second packet, and, since there is more than one packet in the output queue, port module 28 accesses the offset in the second entry indicating first word 40 to which the second packet has been written. When port module 28 has finished reading the first packet from stream memory 30, port module 28 reads the second packet from stream memory 30, using the offset in the second entry, starting at first block 38 to which the second packet has been written. If the second packet has been written to more than one block 38, port module 28 can use a linked list in tag memory 32 to read the second packet from memory, as described above.

While port module 28 is reading the second packet from stream memory 30, port module 28 copies the pointer in the second entry to the read pointer, compares the read pointer with the write pointer, and determines, from the comparison, that there is only one packet in the output queue. Port module 28 then uses the read pointer to determine a next packet to read from stream memory 30. The read pointer refers port module 28 to third block 38 of the second packet, and, since there is only one packet in the output queue, port module 28 accesses the offset in the register indicating first word 40 to which the third packet has been written. When port module 28 has finished reading the second packet from stream memory 30, port module 28 reads the third packet from stream memory 30, using the offset in the register, starting at first block 38 to which the third packet has been written. If the third packet has been written to more than one block 38, port module 28 can use a linked list in tag memory 32 to read the third packet from memory, as described above.

If a port module 28 includes more than one output queue, a port module 28 can arbitrate among the multiple output queues of port module 28 using a deficit round-robin technique. According to a traditional deficit round-robin technique, each output queue of port module 28 has a corresponding deficit counter. Port module 28 reads packets from the output queues in a series of rounds in which a quantum of bytes is added to each deficit counter, and port module 28 may read from an output queue no more than the number of bytes indicated by the deficit counter corresponding to the output queue. If a packet in an output queue contains more bytes than may, according to a deficit counter corresponding to the output queue, be read from the output queue in a round, port module 28 waits until a later round, when enough bytes have been added to the deficit counter, to read the packet from the output queue. According to the traditional deficit round-robin technique, the length of a packet in an output queue must be known before port module 28 starts reading the packet. Since the length of a packet cannot be known until the entire packet has been received, the traditional deficit round-robin technique does not enable cut-through or delayed cut-through forwarding.

According to a deficit round-robin technique that, in contrast to a traditional deficit round-robin technique, enables cut-through and delayed cut-through forwarding, each output queue of a port module 28 has a corresponding deficit counter. Port module 28 reads packets from the output queues in a series of rounds in which a quantum of bytes is added to the value of each deficit counter, and port module 28 may read a packet from an output queue in a round if the value of the deficit counter corresponding to the output queue is zero or greater than zero. When a packet is read from an output queue, the number of bytes in the packet is subtracted from the value of the deficit counter corresponding to the output queue.

As an example, consider a port module 28 that has four output queues. A first deficit counter corresponds to a first output queue, a second deficit counter corresponds to a second output queue, a third deficit counter corresponds to a third output queue, and a fourth deficit counter corresponds to a fourth output queue. Each of the output queues has an initial value of zero. In a first round, port module 28 reads a first packet from the first output queue that is 600 bytes long and subtracts 600 bytes from the first deficit counter such that the value of the deficit counter becomes −600. Port module 28 then reads a first packet from the second output queue that is 500 bytes long and subtracts 500 bytes from the second deficit counter such that the value of the deficit counter becomes −500. Port module 28 then reads a first packet from the third output queue that is 100 bytes long and subtracts 100 bytes from the third deficit counter such that the value of the deficit counter becomes −100. Port module 28 then reads a first packet from the fourth output queue that is 180 bytes long and subtracts 180 bytes from the second deficit counter such that the value of the deficit counter becomes −180.

In a second round, port module 28 adds a quantum of 500 bytes to the value of the first deficit counter such that the value of the first deficit counter becomes −100. Because the value of the first deficit counter, after the quantum of bytes has been added to the value of the first deficit counter, is less than zero, port module 28 does not read a packet from the first output queue in the second round. Since no packet is read from the first output queue, the value of the first deficit counter is not changed. Port module 28 then adds a quantum of 500 bytes to the value of the second deficit counter such that the value of the second deficit counter becomes zero. Because the value of the second deficit counter, after the quantum of bytes has been added to the value of the second deficit counter, is zero or greater than zero, port module 28 reads a second packet from the second output queue. The packet is 500 bytes long, and port module 28 subtracts 500 bytes from the value of the second deficit counter such that the value of the second deficit counter again becomes −500. Port module 28 then adds a quantum of 500 bytes to the value of the third deficit counter such that the value of the third deficit counter becomes 400. Because the value of the third deficit counter, after the quantum of bytes has been added to the value of the third deficit counter, is zero or greater than zero, port module 28 reads a second packet from the third output queue. The packet is 600 bytes long, and port module 28 subtracts 600 bytes from the value of the deficit counter such that the value of the third deficit counter becomes −200. Port module 28 adds a quantum of 500 bytes to the value of the fourth deficit counter such that the value of the fourth deficit counter becomes 320. Because the value of the fourth deficit counter, after the quantum of bytes has been added to the value of the fourth deficit counter, is zero or greater than zero, port module 28 reads a second packet from the fourth output queue. The packet is 700 bytes long, and port module 28 subtracts 700 bytes from the value of the fourth deficit counter such that the value of the fourth deficit counter becomes −380.

In a third round, port module 28 adds a quantum of 500 bytes to the value of the first deficit counter such that the value of the first deficit counter becomes 400. Because the value of the first deficit counter, after the quantum of bytes has been added to the value of the first deficit counter, is zero or greater than zero, port module 28 reads a second packet from the first output queue. The packet is 750 bytes long, and port module 28 subtracts 750 bytes from the value of the first deficit counter such that the value of the first deficit counter becomes −350. The third round continues in a similar fashion, as do subsequent rounds.

Although a particular deficit round-robin technique that enables cut-through and delayed cut-through forwarding is described, the present invention contemplates any suitable deficit round-robin technique that enables cut-through and delayed cut-through forwarding. As an example, instead of adding the same quantum of bytes to each output queue in each round, port module 28 could add different quanta of bytes to different output queues in each round, add different quanta of bytes to the same output queue in different rounds, or both. As another example, instead of a port module 28 being allowed to read from an output queue if the value of the deficit counter corresponding to the output queue is zero or greater than zero, a port module 28 could be allowed to read from an output queue only if the value of the deficit counter corresponding to the output queue is greater than zero. As another example, instead of a port module 28 reading only one packet from an output queue in a round, port module 28 could read more than one packet from the output queue in a round. Port module 28 could read a first packet from the output queue, subtract the number of bytes in the first packet from the value of the deficit counter corresponding to the output queue, and, if the value of the deficit counter is still zero or greater than zero after reading the first packet from the output queue and subtracting the number of bytes in the first packet from the value of the deficit counter, read a second packet from the output queue.

In particular embodiments, instead of a deficit counter including a number of bytes and a quantum of bytes being added to the deficit counter in a round, a deficit counter can include a number of credits and a quantum of credits can be added, in a round, to the value of the deficit counter. When a port module 28 reads a packet from stream memory 30, the number of blocks 38 from which the packet has been read can be subtracted from the value of a deficit counter, and, in a round, a quantum of credits can be added to the value of the deficit counter. Port module 28 may read from the output queue corresponding to the deficit counter if the value of the deficit counter is zero or greater than zero. In particular embodiments, deficit round-robin scheduling can be implemented using a round-robin arbiter and controlling a next state of the round-robin arbiter, which can provide robust operation. If deficit round-robin scheduling is enabled and a deficit counter is available, the round-robin arbiter could stay in the same state. In these embodiments, a request is never masked by the deficit counter, which eliminates the possibility of starvation. In particular embodiments, because the memory structure of a port module 28 covers all of stream memory 30 and an output queue cannot become full, special handling of an output queue when the output is full is not required.

Figure 5:
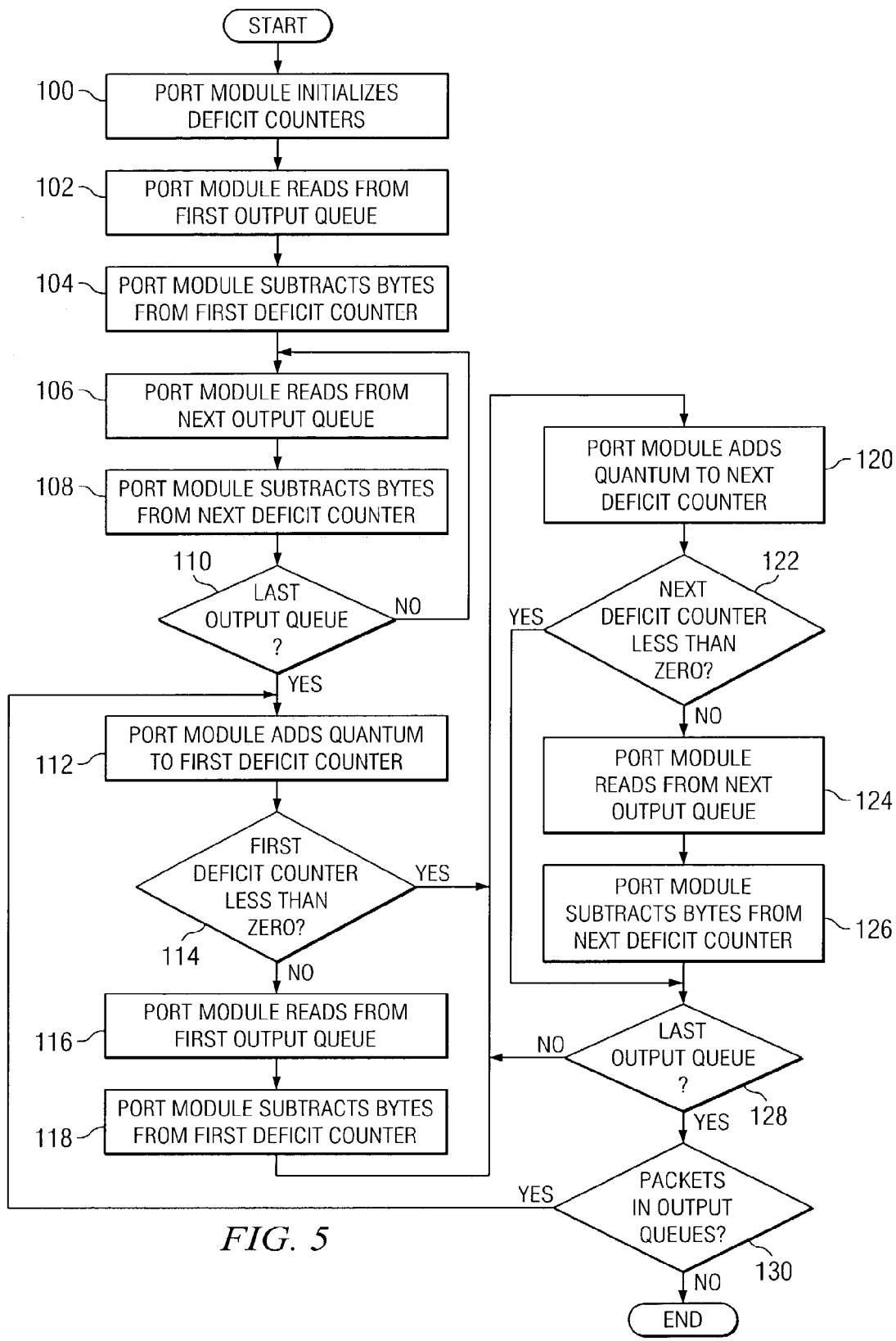
FIG. 5 illustrates an example method for deficit round-robin scheduling in a high-speed switching environment.

FIG. 5 illustrates an example method for deficit round-robin scheduling in a high-speed switching environment. The method begins at step 100, where a port module 28 initializes the values of two or more deficit counters that each correspond to an output queue of port module 28. At step 102, port module 28 reads a first packet from the first output queue of port module 28. At step 104, port module 28 subtracts the number of bytes in the first packet from the value of the first deficit counter corresponding to the first output queue. At step 106, port module 28 reads a first packet from the next output queue of port module 28. At step 108, port module 28 subtracts the number of bytes in the first packet from the value of the next deficit counter corresponding to the next output queue. At step 110, if the next output queue is not the last output queue of port module 28, the method returns to step 106. At step 110, if the next output queue is the last output queue of port module 28, the method proceeds to step 112.

At step 112, port module 28 adds a quantum of bytes to the value of the first deficit counter. At step 114, if the value of the first deficit counter is zero or greater than zero, the method proceeds to step 116. At step 114, if the value of the first deficit counter is less than zero, the method proceeds to step 120. At step 116, port module 28 reads a next packet from the first output queue. At step 118, port module 28 subtracts the number of bytes in the next packet from the value of the first deficit counter. At step 120, port module 28 adds a quantum of bytes to the value of the next deficit counter. At step 122, if the value of the next deficit counter is zero or greater than zero, the method proceeds to step 124. At step 122, if the value of the first deficit counter is less than zero, the method proceeds to step 128. At step 124, port module 28 reads a next packet from the next output queue. At step 126, port module 28 subtracts the number of bytes in the next packet from the value of the next deficit counter. At step 128, if the next output queue is not the last output queue, the method returns to step 120. At step 128, if the next output queue is the last output queue, the method proceeds to step 130. At step 130, if there are no more packets in the two or more output queues of port module 28, the method ends. At step 130, if there are more packets in the two or more output queues of port module 28, the method returns to step 112. Although particular steps of the method described above are described and illustrated as occurring in a particular order, the present invention contemplates any suitable steps of the method described above occurring in any suitable order.

Although the present invention has been described with several embodiments, sundry changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A system for scheduling in a high-speed switching environment, the system comprising:
   a plurality of output queues;
   a plurality of counters that each correspond to one of the output queues; and
   an output port operable to read packets from the output queues in a series of rounds and operable, in each of the rounds, to:
   access at least one of the output queues;
   increment the counter corresponding to the output queue by a first amount;
   determine whether the counter corresponding to the output queue is at or above a particular predetermined level, the particular predetermined level being the same for all the output queues; and
   if the counter is at or above the particular predetermined level:
   read one or more packets from the output queue that each have a length; and
   decrement the counter by a second amount corresponding to the one or more lengths of the one or more read packets.

2. The system of claim 1, wherein:
   the counter comprises a value corresponding to a number of bytes; and
   the first and second amounts each comprise a number of bytes.

3. The system of claim 1, wherein:
   the counter comprises a value corresponding to a number of credits; and
   the first and second amounts each comprise a number of credits.

4. The system of claim 1, wherein: the scheduling is implemented with an arbiter and by controlling a next state of the arbiter.

5. The system of claim 1, wherein the particular level corresponds to zero.

6. The system of claim 1, wherein the output port is operable, in each of the rounds, to read only one packet from the output queue.

7. The system of claim 1, wherein the output port is operable, in each of the rounds, to continue to read packets from the output queue as long as the counter remains at or above the particular level.

8. The system of claim 1, wherein the output port is operable, in each of the rounds, to increment different counters by different amounts.

9. The system of claim 1, wherein the output port is operable, in each of the rounds, to decrement different counters by a same amount.

10. The system of claim 1, wherein the output port is operable, in each of the rounds, to read different numbers of packets from different output queues.

11. The system of claim 1, wherein the output port is operable, in each of the rounds, to read a same number of packets from different output queues.

12. The system of claim 1, wherein the system is embodied in a single integrated circuit (IC).

13. The system of claim 1, wherein the high-speed switching environment is an Ethernet switching environment, an INFINIBAND switching environment, a 3GIO switching environment, a HYPERTRANSPORT switching environment, a RAPID IO switching environment, or a proprietary backplane switching environment.

14. A method for scheduling in a high-speed switching environment, the method comprising:
   in a series of rounds, reading packets from a plurality of output queues that each correspond to one of a plurality of counters and, in each of the rounds:
   accessing at least one of the output queues;
   incrementing the counter corresponding to the output queue by a first amount;
   determining whether the counter corresponding to the output queue is at or above a particular predetermined level, the particular predetermined level being the same for all the output queues; and if the counter is at or above the particular predetermined level:

reading one or more packets from the output queue that each have a length; and decrementing the counter by a second amount corresponding to the one or more lengths of the one or more read packets.

15. The method of claim 14, wherein:
the counter comprises a value corresponding to a number of bytes; and
the first and second amounts each comprise a number of bytes.

16. The method of claim 14, wherein:
the counter comprises a value corresponding to a number of credits; and
the first and second amounts each comprise a number of credits.

17. The method of claim 14, wherein: the scheduling is implemented with an arbiter and by controlling a next state of the arbiter.

18. The method of claim 14, wherein the particular level corresponds to zero.

19. The method of claim 14, comprising, in each of the rounds, reading only one packet from the output queue.

20. The method of claim 14, comprising, in each of the rounds, continuing to read packets from the output queue as long as the counter remains at or above the particular level.

21. The method of claim 14, comprising, in each of the rounds, incrementing different counters by different amounts.

22. The method of claim 14, comprising, in each of the rounds, decrementing different counters by a same amount.

23. The method of claim 14, comprising, in each of the rounds, reading different numbers of packets from different output queues.

24. The method of claim 14, comprising, in each of the rounds, reading a same number of packets from different output queues.

25. The method of claim 14, wherein the method is executed by a single integrated circuit (IC).

26. The method of claim 14, wherein the high-speed switching environment is an Ethernet switching environment, an INFINIBAND switching environment, a 3GIO switching environment, a HYPERTRANSPORT switching environment, a RAPID IO switching environment, or a proprietary backplane switching environment.

27. A system for scheduling in a high-speed switching environment that comprises an Ethernet switching environment, an INFINIBAND switching environment, a 3GIO switching environment, a HYPERTRANSPORT switching environment, a RAPID IO switching environment, or a proprietary backplane switching environment, the system being embodied in a single integrated circuit (IC) and comprising:

a plurality of output queues;

a plurality of counters that each correspond to one of the output queues; and an output port operable to read packets from the output queues in a series of rounds and operable, in each of the rounds, to:

access at least one of the output queues;

increment the counter corresponding to the output queue by a first amount;

determine whether the counter corresponding to the output queue is at or above a particular predetermined level corresponding to zero, the particular predetermined level being the same for all the output queues; and if the counter is at or above the particular predetermined level:

read one packet from the output queue that has a length; and decrement the counter by a second amount corresponding to the length of the read packet.

28. A system for scheduling in a high-speed switching environment, the system comprising:

means for, in a series of rounds, reading packets from a plurality of output queues that each correspond to one of a plurality of counters and, in each of the rounds:

accessing at least one of the output queues;

incrementing the counter corresponding to the output queue by a first amount;

determining whether the counter corresponding to the output queue is at or above a particular predetermined level, the particular predetermined level being the same for all the output queues; and if the counter is at or above the particular predetermined level:

reading one or more packets from the output queue that each have a length; and decrementing the counter by a second amount corresponding to the one or more lengths of the one or more read packets.

* * * * *